United States Patent [19]

Mazumder

[11] Patent Number: 5,266,786
[45] Date of Patent: Nov. 30, 1993

[54] MAGNETORESISTIVE HEAD FOR READING MAGNETIC INK CHARACTERS

[75] Inventor: Ali T. Mazumder, Waterloo, Canada

[73] Assignee: NCR Corporation, Dayton, Ohio

[21] Appl. No.: 769,909

[22] Filed: Oct. 1, 1991

[51] Int. Cl.$^5$ .............................................. G11B 5/33
[52] U.S. Cl. ...................................... 235/449; 360/113
[58] Field of Search ...................... 235/439, 440, 449; 360/113

[56] References Cited

U.S. PATENT DOCUMENTS

| | | | |
|---|---|---|---|
| 3,796,859 | 3/1974 | Thompson | 235/61.11 |
| 3,813,692 | 5/1974 | Brock et al. | 360/113 |
| 3,814,863 | 6/1974 | O'Day et al. | 360/113 |
| 3,840,898 | 10/1974 | Bajorek et al. | 360/113 |
| 3,921,218 | 11/1975 | Kayser | 360/113 |
| 4,182,481 | 1/1980 | Maussion | 235/449 |
| 4,184,631 | 1/1980 | Lazzari | 235/449 |
| 4,212,041 | 7/1980 | Lazzari et al. | 360/113 |
| 4,623,867 | 11/1986 | Lundquist et al. | 338/32 R |
| 4,703,378 | 10/1987 | Imakoshi et al. | 360/113 |
| 4,733,455 | 3/1988 | Nakamura et al. | 29/603 |
| 4,734,644 | 3/1988 | Imakoshi et al. | 324/252 |
| 4,816,948 | 3/1989 | Kamo et al. | 360/113 |
| 4,899,240 | 2/1990 | McClure | 360/113 |
| 4,903,158 | 2/1990 | Smith | 360/113 |
| 4,928,188 | 5/1990 | Brock | 360/113 |
| 5,084,794 | 1/1992 | Smith | 360/113 |
| 5,155,643 | 10/1992 | Jones, Jr. et al. | 360/113 |

*Primary Examiner*—Edward P. Westin
*Assistant Examiner*—John R. Lee
*Attorney, Agent, or Firm*—Elmer Wargo

[57] ABSTRACT

A method and read head for reading MICR characters using magnetoresistive technology. First and second magnetoresistive sensors are printed on a substrate which is supported on a base. The first and second magnetoresistive sensors have a width W and a gap G therebetween, with W and G bearing a relationship to a font of MICR characters to be read. The first and second magnetoresistive sensors are coupled to a full bridge circuit to provide adequate sensitivity to read the MICR characters by the magnetoresistive technology.

6 Claims, 8 Drawing Sheets

FIG. 12   PRIOR ART
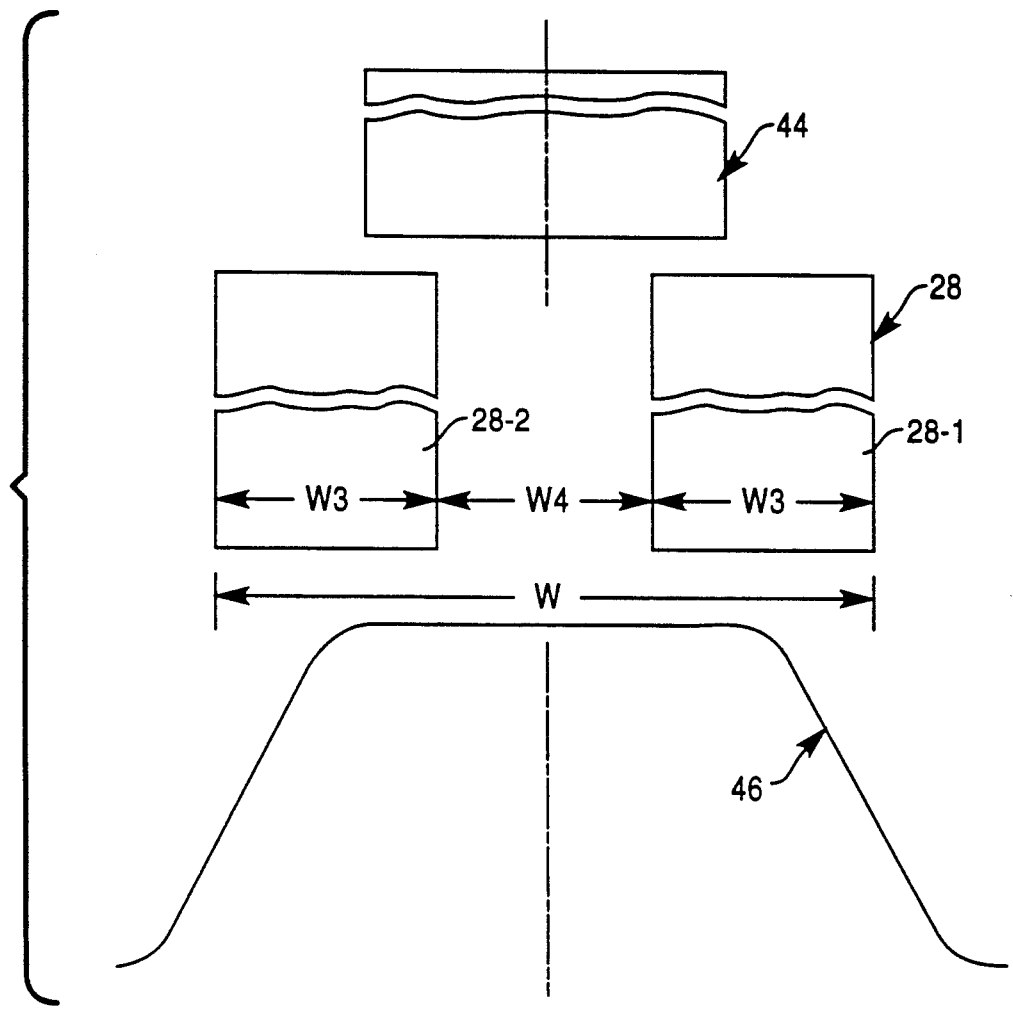
FIG. 13
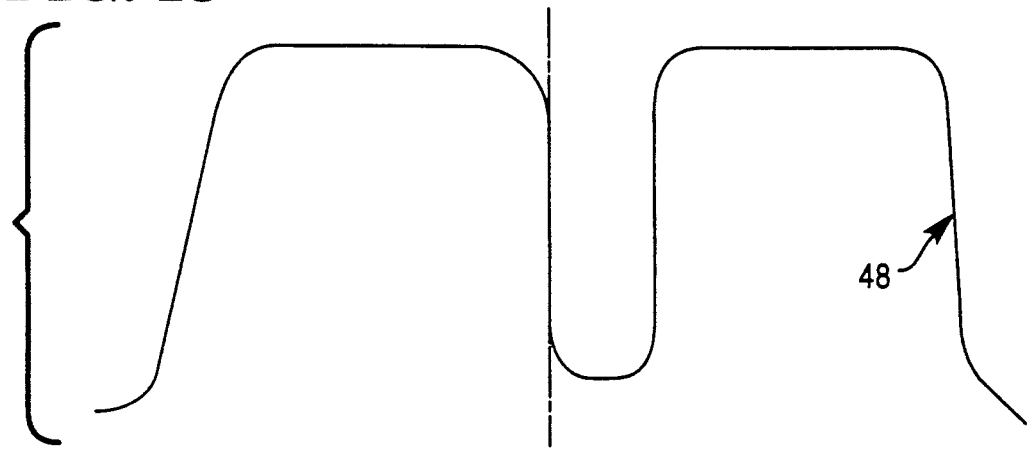

MAGNETORESISTIVE HEAD FOR READING MAGNETIC INK CHARACTERS

BACKGROUND OF THE INVENTION (1) Field of the Invention

This invention relates to a method and apparatus for reading characters printed in magnetic ink which have a very weak magnetic field strength, with this invention utilizing magnetoresistive technology.

(2) Background Information

At the present time, MICR characters or those printed on documents in magnetic ink according to E13B and CMC 7 fonts, for example, have a magnetic field strength which is extremely weak. A poorly printed but still acceptable single printed bar in the CMC 7 font or coding, for example, may have a magnetic field strength of approximately 0.06Gauss. At the present time, such a weak magnetic field strength can be detected reliably only through using a read head which employs inductive technology.

There are several disadvantages in using an inductive type read head for reading MICR data on documents; they are:

1. The read head has a large number of coil turns therein, making the read head bulky and expensive to manufacture due to the manual or at best semiautomatic processes involved.

2. In order to obtain a satisfactory signal strength, it is necessary that there be high relative speed or velocity between the read head and the associated MICR characters on the document. In other words, the strength of the output signal is dependent upon the relative velocity mentioned. At the present time, about 400 inches per second is about the maximum feasible speed for moving a document past a stationary read head. At the slow end, a minimum of about 45 inches per second is what is needed to obtain a sufficient output for reading. At about 20 inches per second, the inductive type read head does not produce an output while using a practically feasible number of turns.

3. The physical size of the read head is bulky.

4. In order to achieve a good signal-to-noise ratio, it is necessary that the relative velocity between the read head and the MICR character be maintained at a high level.

With regard to prior art read heads which employed magnetoresistive technology, there was not enough signal strength developed for reading MICR data or characters from a document.

SUMMARY OF THE INVENTION

The present invention obviates the problems enumerated above in that it uses magnetoresistive technology in which a unique design is utilized for the reading elements included in the read head and special circuits are included for providing the necessary sensitivity for utilizing the outputs from the reading elements when reading MICR data from a document, for example.

The present invention includes a read head which is manufactured as a thin film device, making the read head inexpensive to manufacture and small in size.

The signal strength or output of the read head made according to the present invention is independent of the relative velocity between the characters on the document and the read head.

In a preferred form of the invention there is provided a read head for reading MICR characters on a document comprising:

a substrate having first and second magnetoresistive elements thereon, with said first and second magnetoresistive elements having a width W and a gap G therebetween, with said W and G bearing a relationship to a font of the MICR characters to be read; and connection means for connecting said first and second magnetoresistive elements to a circuit.

The above advantages and features and others will be more readily understood in connection with the following description, claims, and drawing.

BRIEF DESCRIPTION OF THE DRAWING

FIG. 12 is a schematic showing of a certain prior art waveshape associated with reading a portion of a character printed according to a CMC 7 font.

FIG. 13 is a waveshape which occurs when reading the portion of the character shown in FIG. 12.

DESCRIPTION OF THE PREFERRED EMBODIMENT

Figure 1:
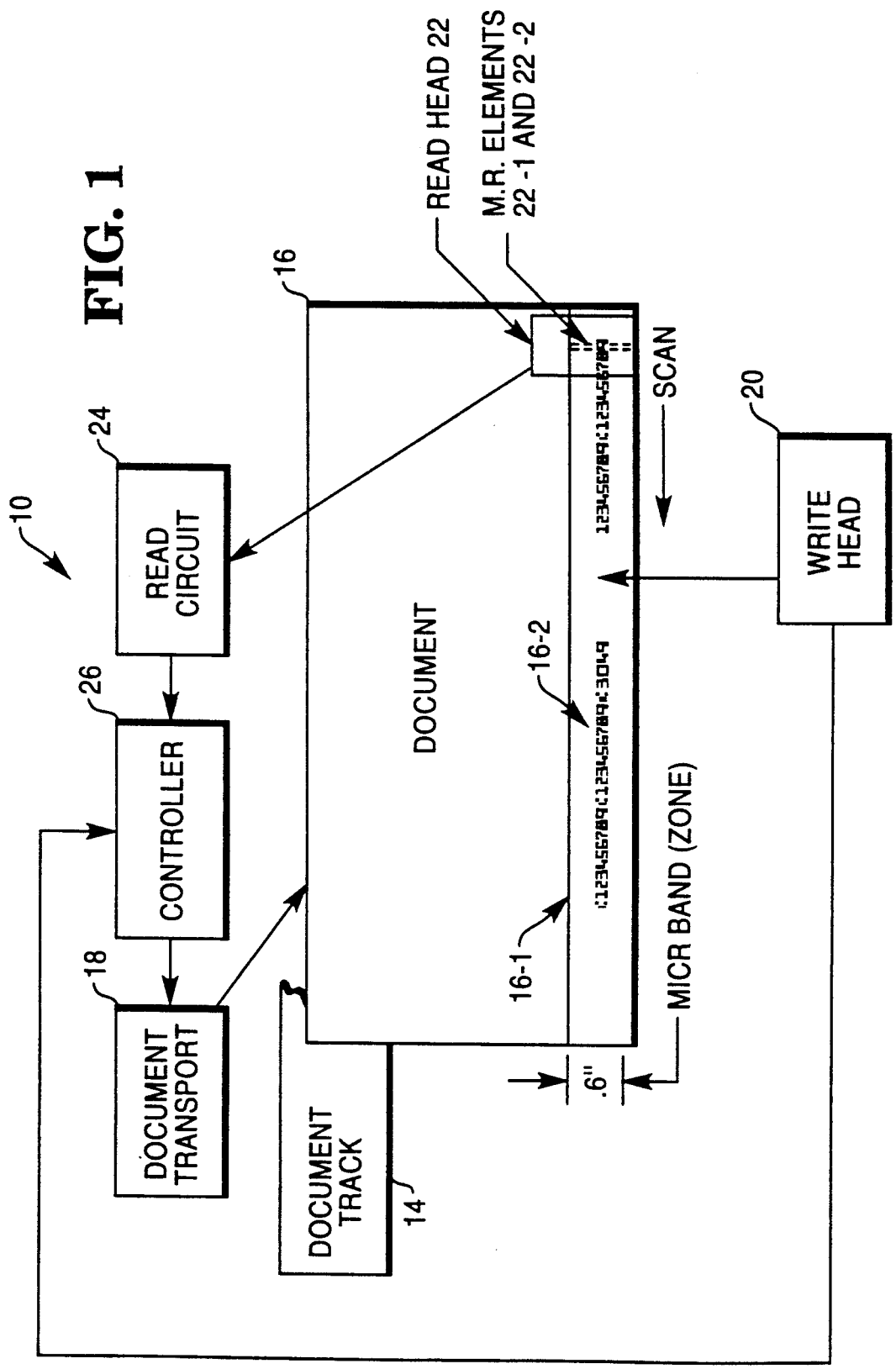
FIG. 1 is a schematic diagram showing a document with MICR characters thereon in reading relationship with a read head made according to this invention.

FIG. 1 is a schematic diagram showing an apparatus 10 in which a read head made according to this invention may be used. The apparatus 10 includes a document track 14 which receives a document 16 to be read. The document 16 has a MICR band or zone 16-1 near the bottom of the document 16, as viewed in FIG. 1, with the MICR characters 16-2 to be read being located in the zone 16-1. The apparatus 10 also includes a document transport 18 which moves the document 16 to be read past a write head 20 to magnetize the magnetic ink on the document for the characters to be read. The document transport 18 then moves the document 16 in operative relationship with a read head 22 which is the subject of this invention. The output of the read head 22 is directed to a read circuit 24 whose output is fed to a controller 26.

Figure 2:
FIG. 2 is a diagram of the character "0" or zero printed in CMC 7 font.
Figure 3:
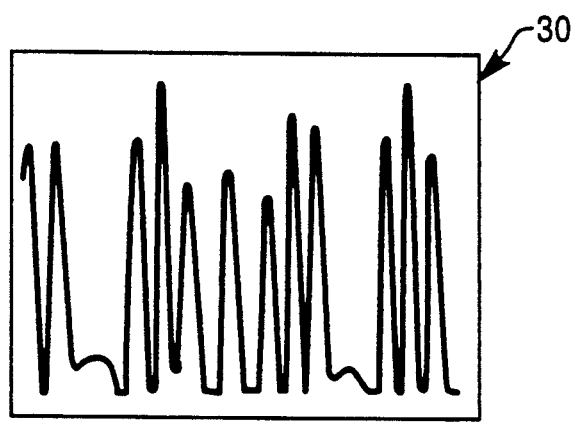
FIG. 3 is a magnetic waveform of the character shown in FIG. 2.
Figure 4:
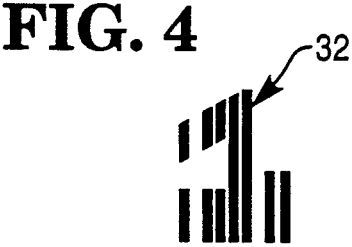
FIG. 4 is a diagram of the character "1" printed in CMC 7 font.
Figure 5:
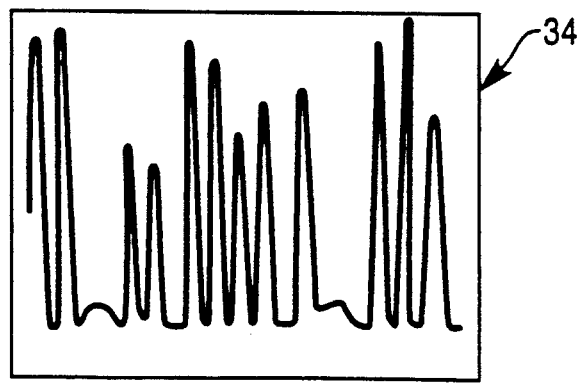
FIG. 5 is a magnetic waveform of the character shown in FIG. 4.
Figure 6:
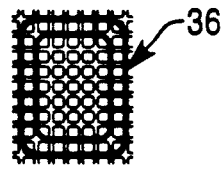
FIG. 6 is a diagram of the character "0" or zero printed in E13B font.
Figure 7:
FIG. 7 is a magnetic waveform of the character shown in FIG. 6.
Figure 8:
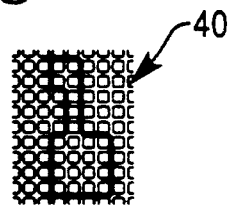
FIG. 8 is a diagram of the character "1" printed in E13B font.
Figure 9:
FIG. 9 is a magnetic waveform of the character shown in FIG. 8

Before discussing the read head 22 in more detail, it appears useful to discuss two different types or fonts of characters printed in magnetic ink. FIG. 2 shows a character 28 which is a "0" or zero printed in CMC 7 font, and FIG. 3 shows the associated wave form 30 which results when the character 28 is moved relative to the read head 22. Correspondingly, FIG. 4 shows a character 32 which is a "1" printed in the CMC 7 font, and FIG. 5 shows the associated wave form 34. FIG. 6 shows a character 36 which is a "0" or zero printed in E13B font, and FIG. 7 shows the associated wave form 38 which results when the character 28 is moved relative to the read head 22. Correspondingly, FIG. 8 shows a character 40 which is a "1" printed in the E13B font, and FIG. 9 shows the associated wave form 42. While this invention is described in relation to these two fonts, the principles of this invention may be extended to other characters or data printed in magnetic ink.

Figure 10:
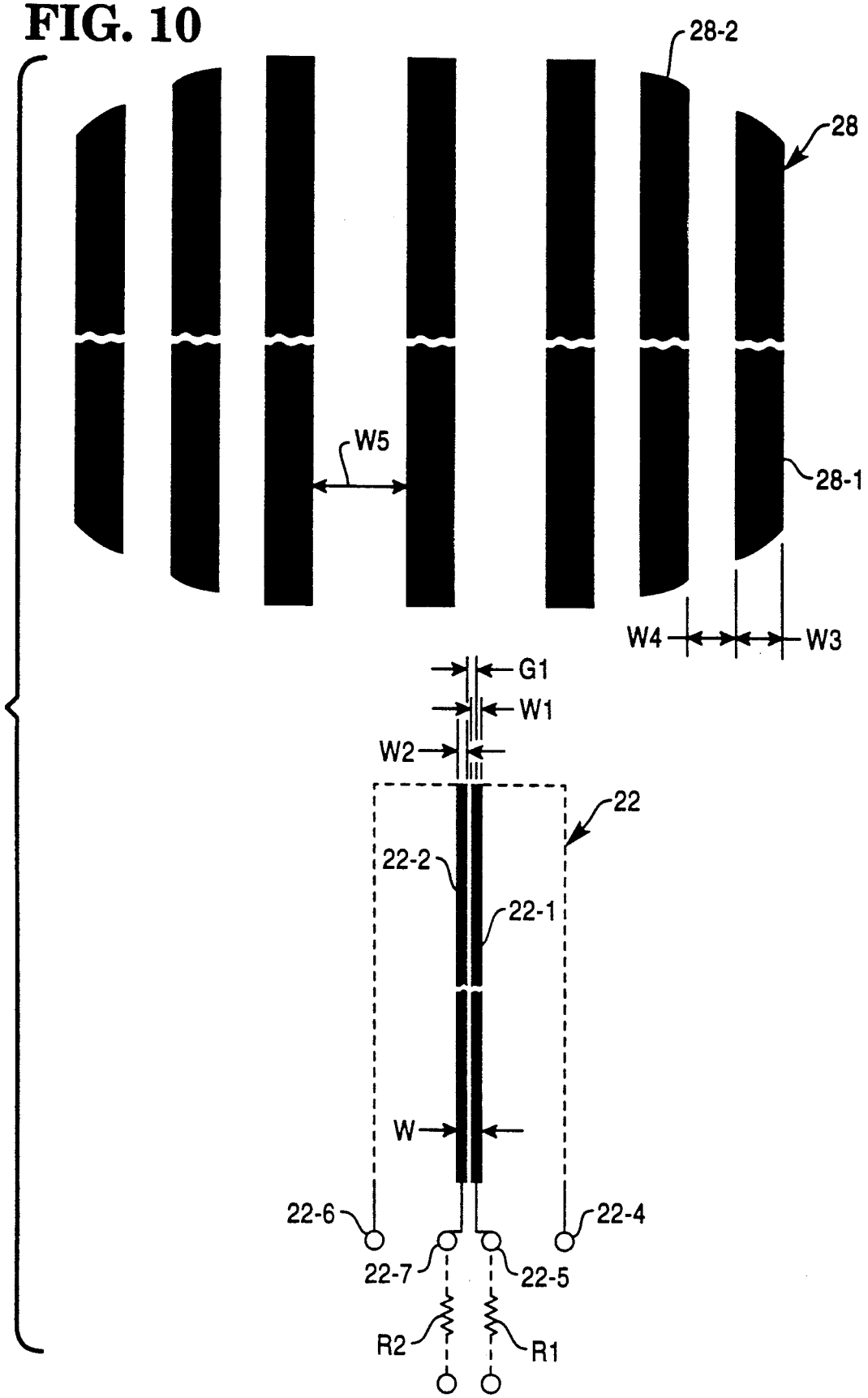
FIG. 10 is an enlarged schematic diagram showing the relationship between magnetoresistive sensors or sensing elements included in the read head shown in FIG. 1 and a MICR character printed in CMC 7 font.
Figure 11:
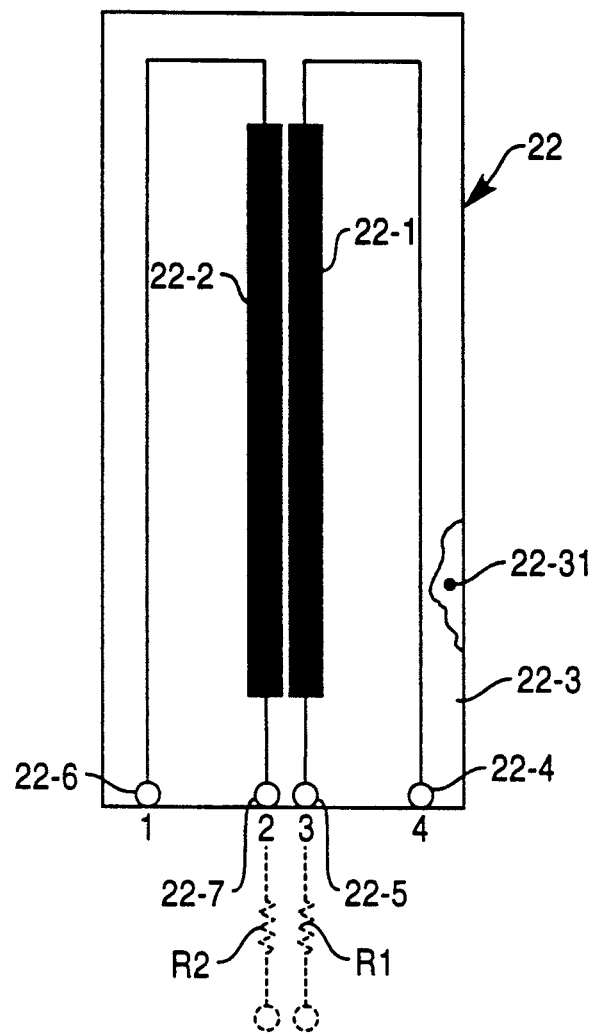
FIG. 11 is a schematic diagram of the read head as it is formed on a substrate.

The read head 22 shown in FIG. 1 is shown in more detail in FIGS. 10 and 11. The read head 22 includes first and second magnetoresistive elements 22-1 and 22-2 which are located or deposited on a silicon substrate 22-3 (FIG. 11) and mounted on a base 22-31, like glass. Connection means, like terminal pins 22-4 and 22-5, are used to couple the first magnetoresistive element 22-1 to an outside circuit, and similarly, terminal pins 22-6 and 22-7 are used to couple the second magnetoresistive element 22-2 to an outside circuit. In the embodiment described, the first and second magnetoresistive elements 22-1 and 22-2 are made of NiFe Permalloy and are deposited on the substrate 22-3 and mounted on the glass base 22-31.

The relationship of the print head 22 to the MICR character to be read is shown best in FIG. 10. The top portion of FIG. 10 shows the character 28 which is a "0" as printed in CMC 7 font as discussed in relation to FIG. 2. The character 28 is enlarged in general and compressed in the vertical direction in FIG. 10; however, the width of the bars and spaces which make up the character are shown in the correct scale relative to the width of the first and second magnetoresistive elements 22-1 and 22-2 also shown in FIG. 10. The width of the first magnetoresistive element 22-1 is shown as W1, and correspondingly, the width of the second element 22-2 is W2, with W1=W2. The gap or distance between the magnetoresistive elements 22-1 and 22-2 is G1. The width of all the bars, like 28-1, of a character in CMC 7 encoding or font is equal to W3, and this particular font has two different spacings between the bars. The spacings have a narrow width which is W4 and a wide width which is W5, with W5=2 (W4). The dimensions W3, W4, and W5, in various combinations, are dictated by the particular font used. As seen in FIG. 10, W is equal to W1+W2+G1 or 2W1+G1. For a preferred form of the embodiment:

W is less than or equal to ½ W3, and
G1 is less than or equal to 0.3×W1.

The above parameters provide for optimum performance of the read head 22 even on a worst case basis, as for example, for a situation in which, for a character, the bar width is a maximum and the space between the bars is at a minimum in CMC 7 font.

In the embodiment described, the read head 22 has the following dimensions. W1=W2=0.0013 inch, and the gap G1 therebetween equals 0.0003 inch, making a total width W, as shown in FIG. 10, equal to 0.0029 inch. The width (W3) of a bar, like 28-1 in FIG. 10, is equal to 0.006 inch, and the width of the narrow spacing (W4) is also 0.006 inch. Notice that the total width W (0.00029) of the read head 22 is less than the width W3 (0.006) of a bar 28-1 in the CMC 7 font; this is shown in FIG. 10.

One of the problems with prior art magnetoresistive read heads was that the width of the sensor was generally wider than the width of the bar, like 28-1. FIG. 12 shows a prior art read head 44 having a width of about 0.010 inch; notice that this width is greater than the width of a bar, like 28-1, of a character 28. The resulting magnetic waveform 46 was not able to distinguish between the two bars 28-1 and 28-2 making up the portion of the character shown. With the read head 22, a magnetic waveform 48 (FIG. 13) is generated, with the waveform 48 being positioned below waveform 46 to show the comparison when reading the same portion of the character 28. The width (W) of the read head 22 (FIG. 10) is less than the width of a bar 28-1 in the CMC 7 font. One of the problems with prior art readers was that they were not able to get the sensitivity required to read the low level signals which are provided by the MICR characters on a document or check.

In the embodiment described, the magnetoresistive elements 22-1 and 22-2 of the read head 22 are made of nickel-iron permalloy and deposited on the substrate 22-3 as discussed in relation to FIG. 11. The total resistance of each magnetoresistive element 22-1 and 22-2 is 1.6 K ohms. Another important feature is that when making the magnetoresistive elements 22-1 and 22-2, the maximum magnetic field that an element will be exposed to is about 200 gauss in one embodiment. One of the problems with readers of the type being described is that if the magnetoresistive elements are subjected to a high density field, these magnetoresistive elements will produce a reading; however, they will retain the changed resistance for a long time before returning to the initial state. This is why a field strength maximum is designated. If the read head 22 is to be used in an environment which has a high magnetic field, sufficient magnetic shielding should be provided to avoid the maximum magnetic field mentioned.

Figure 14:
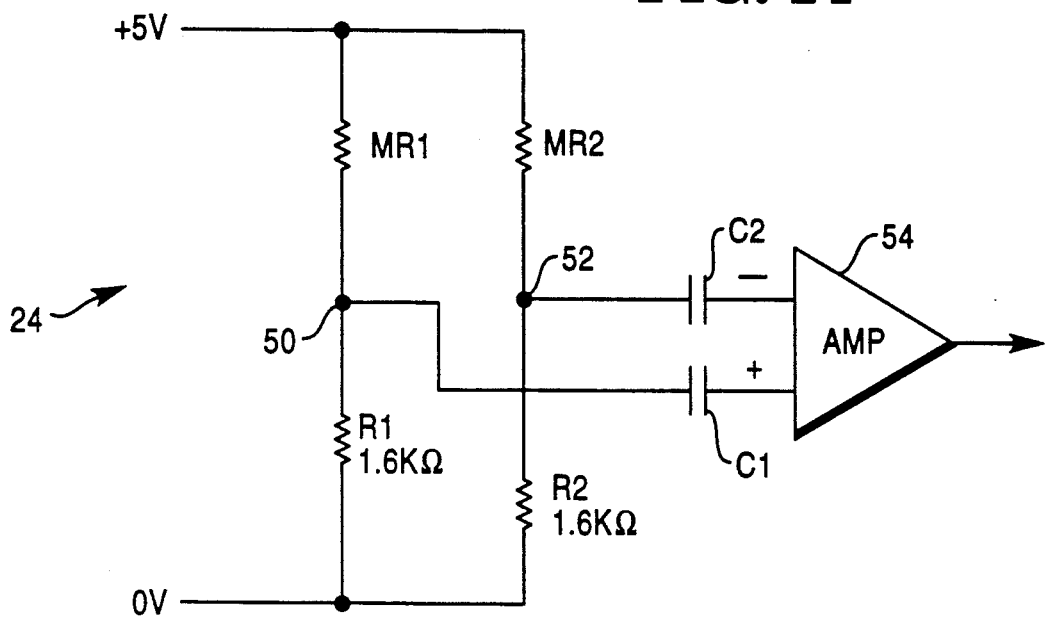
FIG. 14 is a schematic diagram showing a read circuit which is used in reading the output from the magnetoresistive sensing elements shown in FIG. 10.

FIG. 14 is a schematic diagram of the read circuit 24 shown only generally in FIG. 1. To orient the reader, magnetoresistive elements MR1 and MR2, shown in FIG. 14, correspond to the first and second magnetoresistive sensing elements 22-1 and 22-2 shown in FIG. 10, for example. When a document 16 is moved to the right by the document transport shown in FIG. 1, it is the magnetoresistive element MR2 which is first encountered by the MICR characters on the document 16. In the embodiment described, magnetoresistive elements MR1 and MR2 each have a resistance of 1.6 K ohms, and resistors R1 and R2 each have a resistance of 1.6 K ohms. The resistors R1 and R2 are shown in dashed outline in FIGS. 10 and 11.

The operation of the read circuit 24 (FIG. 14) is as follows. When there is no document 16 or no motion of a document 16 in front of the read head 22, the voltage at nodes 50 and 52 is 2.5 volts for the circuit shown. Nodes 50 and 52 are coupled to the (+) and (−) inputs of a differential amplifier 54 through capacitors C1 and C2 as shown. With nodes 50 and 52 at 2.5 volts, the output from the differential amplifier 54 is 0 volts. The read circuit 24 has the general configuration of a full bridge circuit whereas the prior art circuits are generally half bridge circuits for coupling a single sensing element as discussed in relation to FIG. 12.

When a document 16 is moved from left to right (as viewed in FIG. 1), the MICR characters are magnetically activated by the write head 20 as is customarily done. Thereafter, the document 16 is moved into operative relationship with the read head 22 (as viewed in FIG. 1), and the magnetoresistive element MR2 is the first one which will encounter the MICR data on the document 16. When the lines of flux from a character on the document 16 encounter the magnetoresistive element MR2, the resistance of this element is increased, making the voltage level at node 52 decrease below the 2.5 V level which occurs when no document is present in the example being described. Because of this difference in voltage between nodes 50 and 52, there will be an output from the differential amplifier 54.

As the document 16 is moved further to the right (as viewed in FIG. 1) in the example being discussed, the lines of flux from the MICR character which influenced the magnetoresistive element MR2 will then influence the magnetoresistive element MR1. Generally, the lines of flux which influence the magnetoresistive element MR2 are the same which influence the magnetoresistive element MR1, although they are not always the same. When the lines of flux hit the magnetoresistive element MR1, its resistance tends to rise, making the voltage at node 50 fall. Because the voltage level at node 52 has fallen, and shortly thereafter, the voltage level at node 50 also falls, it means that there is little, if any, voltage differential between the nodes 50 and 52. Consequently, it means that there is very little output from the differential amplifier 54. Getting a sufficient output from the read head 22 is an important feature of this invention.

Figure 15:
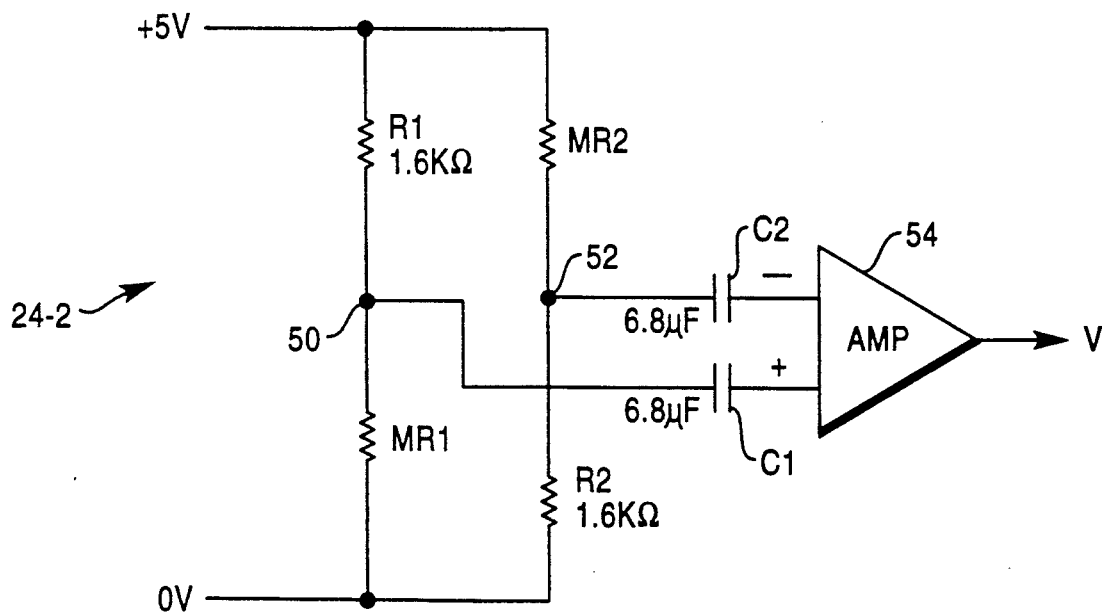
FIG. 15 is a schematic diagram showing a second embodiment of the read circuit shown in FIG. 1.

FIG. 15 is a second embodiment of the read circuit 24 shown in FIG. 1, with the second embodiment being referred to as circuit 24-2. The circuit 24-2 contains the same components as discussed in relation to FIG. 14; however, they are arranged to provide a greater signal strength from the read head 22 than does the read circuit 24. In this regard, the positions of the magnetoresistive element MR1 and its associated resistor are reversed as shown in FIG. 15. Assuming the same physical layout for the read head 22, essentially the same magnetic lines of force will be in flux coupling relationship with the magnetoresistive element MR 2 first, and shortly thereafter, the magnetic lines of force will encounter the magnetoresistive element MR1. When the lines of force encounter the magnetoresistive element MR2, the voltage at node 52 falls as previously discussed, and when the lines of force encounter the magnetoresistive element MR1, the voltage at node 50 rises. As an example, if the voltage at node 52 (FIG. 15) falls to from 2.5 volts to about 2 volts, and the voltage at node 50 rises from 2.5 volts to about 3 volts, there will be a voltage differential of one volt supplied to the operational amplifier 54.

The read circuit 24-2 (FIG. 15) is two times more sensitive than the read circuit 24 shown in FIG. 14. In actuality, the changes in voltage at the nodes 50 and 52 amount to about 100 microvolts. The resistors R1 and R2 which appear in the circuits 24 and 24-2 tend to heat in use, and there is a thermal coefficient associated with them. The capacitors C1 and C2 are there for the purpose of screening out slow DC changes which occur when these resistors R1 and R2 just sit there with current passing through them. In other words, the AC changes which occur when a character on a document passes the read head 22 are the sought-after changes.

In reviewing the read circuit 24-2, for example, due to the way in which it is constructed, the voltage level at node 52 changes from V/2 to (V/2−$e_1$). The voltage level at node 50 changes from V/2 to (V/2+$e_1$). The values $e_1$ and $e_1$ represent the voltage changes at the nodes 52 and 50. Hence, the inputs to the operational amplifier 54, which is a pre-amp stage, will see a difference of (V/2−$e_1$)−(V/2+$e_1$)=−2$e_1$. This difference is two times greater than the difference in the read circuit 24, making the read circuit 24-2 twice as sensitive as the read circuit 24.

Figure 16:
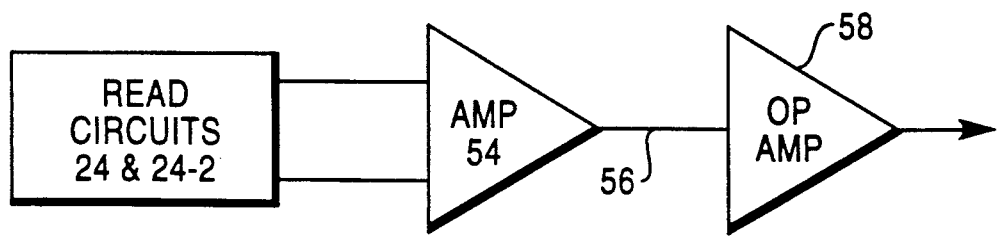
FIG. 16 (shown on the sheet containing FIG. 11) is a schematic block diagram showing an additional operational amplifier added to the read circuits shown in FIGS. 14 and 15.

The differential amplifier 54, shown in FIGS. 14, 15, and 16, provides a gain of 180 at node 56 (FIG. 16) in the embodiments described. To review, the signal level from the read circuit 24-2 is twice the that of the read circuit 24. An operational or op amplifier 58 provides an additional gain of 10. The output of the op amplifier 58 is fed into the controller 26 for further processing which is not important to an understanding of this invention.

Figure 17:
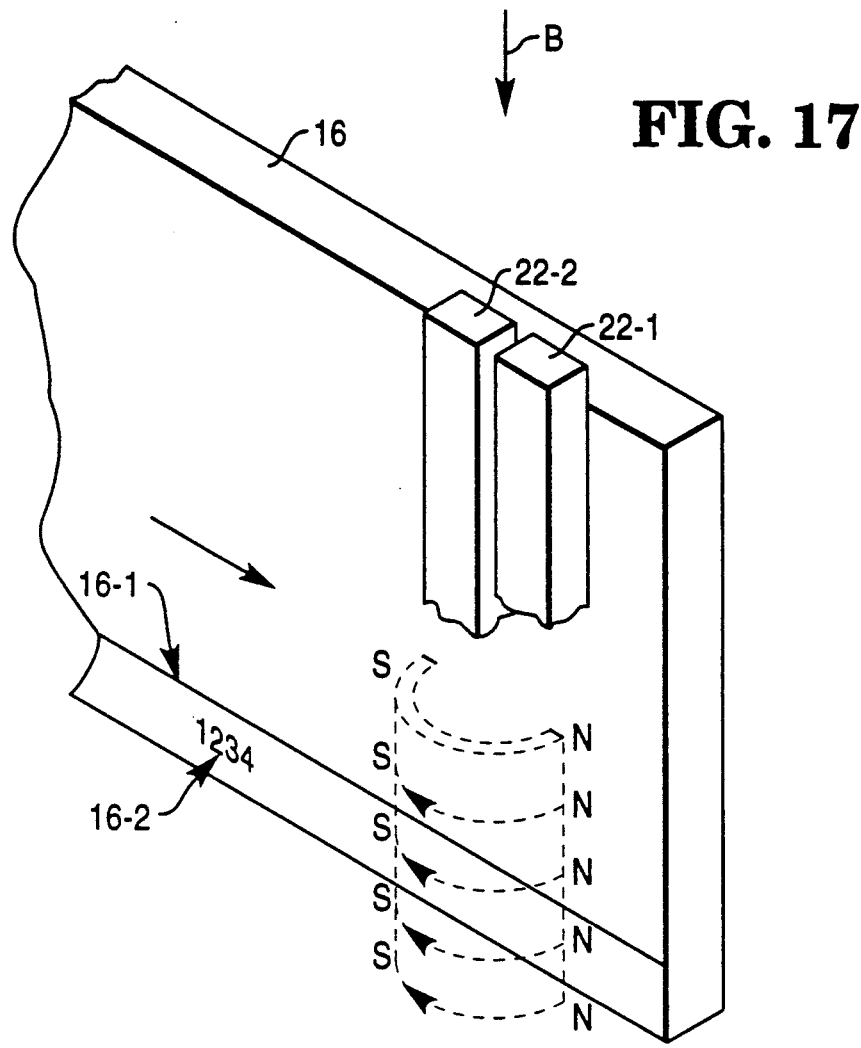
FIG. 17 is a diagram showing how magnetic lines of force are associated with the sensing elements shown in FIG. 11, for example.

Earlier herein, it was stated that the resistance of the magnetoresistive elements 22-1 and 22-2 changes when exposed to magnetic fields. In this regard, FIG. 17 shows the magnetoresistive elements 22-1 and 22-2 as they are positioned relative to the face of the document 16 to read the magnetic waveshapes associated with the MICR characters 16-2. For a magnetoresistive element, $$\text{the resistance } R = R_o + \text{Delta R Cos}^2 \text{Theta},$$

wherein:
- $R_o$ = Isotropic resistance (values are the same at all angles of measurement);
- Delta R = Magnetic resistance (Anisotropic values vary depending upon angle of measurement); and
- Theta = Angle between the current and the magnetization.

Figure 18:
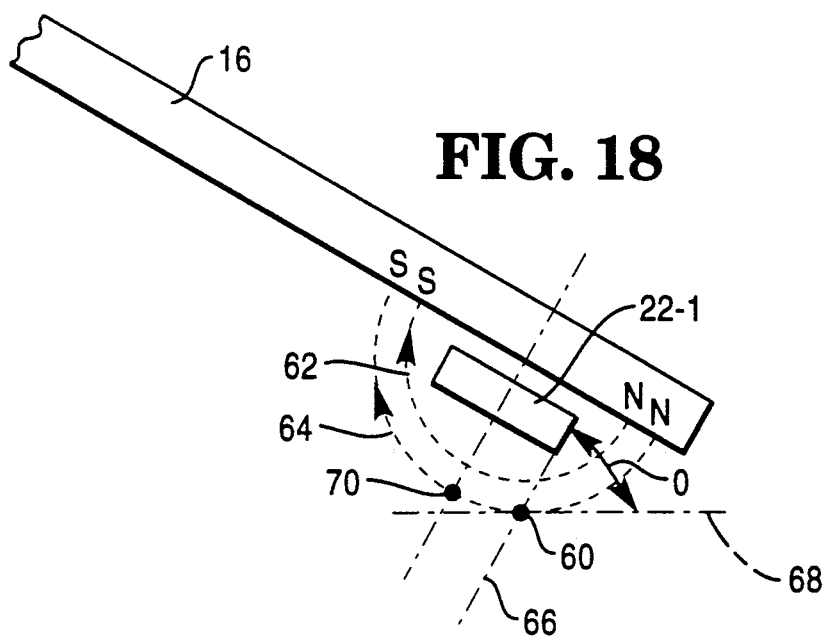
FIG. 18 is a diagram which is taken from the direction of arrow B shown in FIG. 17 to show additional details of the magnetic lines of force.

FIG. 17 shows the first and second magnetoresistive elements 22-1 and 22-2 as they appear in operative relationship with the MICR characters 16-2 appearing on the face of the document 16. FIG. 18 shows the magnetic fields, like magnetization lines 62 and 64, as they are in operative relationship with the first magnetoresistive element 22-1. The angle Theta, referred to in the above equation, is shown in FIG. 18, and its vertex like point 60 is tangent to the magnetization lines shown as lines 64. One side of the angle Theta is formed by a line 66 which is perpendicular to the magnetoresistive element 22-1 and passes through the point 60, and the other side, like line 68, is tangent to the magnetic lines of force 64 at the point 60. Notice that the magnetoresistive element 22-1 produces the maximum signal level when the associated angle Theta is equal to zero which occurs at point 70 in FIG. 18. The cosine of 0 degrees is equal to "1" which means that the resistance R of the magnetoresistive element 22-1 is equal to its isotropic resistance $R_o$. When the angle Theta is 180 degrees, the associated cosine is equal to −1. From the above equation, the resistance R of the magnetoresistive element 22-1 is less than its resistance $R_o$.

Another feature of the present invention compared to the inductive technology mentioned earlier herein relates to the spacing between the document being read and the surface of the associated read head. The maximum space permissible between the document being read and the surface of the read head itself for the inductive technology mentioned is about 0.001 inch. Sometimes a signal can be detected when the spacing is about 0.002 inch; however, the signal received cannot be relied upon as being accurate. With the read head 22 of the present invention, the document being read can be spaced from the surface of the read head 22 by about 0.008 inch and still provide a viable reading. This feature makes the cost of the read head 22 cheaper than the inductive type read head, and it also subjects the read head 22 to less wear when compared to an inductive read head.

Another feature of the read head 22 is that it is not velocity dependent as is the case with the inductive read head. For example, the document 16 can be moved past the read head 22 at speeds ranging from practically zero to 1,000 inches per second. The actual upper limit has not been determined as yet. For example, if a document is moved past a reader at 100 inches per second (IPS), the maximum signal frequency for CMC 7 encoding works out to be about 7 KH. If the document speed is increased to 200 IPS, the maximum signal frequency becomes 14 KH, etc. The frequency response for E13B is less than that for CMC 7. If the document speed were increased to 1000 IPS, the maximum signal frequency would be 70 KH. At a document speed of 3000 IPS, the maximum signal response would be 210 KH. The maximum frequency response for the system 10 is about 200 KH, so close to 3000 IPS would appear to be the limit for the system 10. The point to be made is that it is just about impossible to drive a document at 1000 IPS; in fact, just about 400 IPS appears to be the maximum speed for moving a document in a controlled manner.

What is claimed is:

1. A reader for reading MICR characters on a document comprising:
    a substrate having first and second magnetoresistive elements thereon, with said first and second magnetoresistive elements having a width W and a gap G therebetween, with said W and G bearing a relationship to a font of the MICR characters to be read;
    a first resistor and said first magnetoresistive element being series connected and having a first node therebetween, with a remaining end of said first resistor being coupled to a source of potential and with a remaining end of said first magnetoresistive element being connected to a ground;
    a second resistor and said second magnetoresistive element being series connected and having a second node therebetween, with a remaining end of said second resistor being coupled to said ground and with a remaining end of said second magnetoresistive element being connected to said source of potential;
    a differential amplifier having first and second inputs and an output therefrom;
    first coupling means coupling said first node to said first input of said differential amplifier; and
    second coupling means coupling said second node to said second input of said differential amplifier.

2. The read head as claimed in claim 1 in which said G is approximately 0.3 times said W.

3. The read head as claimed in claim 1 in which said W is approximately 0.5 times W1, with W1 equalling the width of a single bar or a single space in CMC 7 coding.

4. The read head as claimed in claim 1 in which said G is approximately 0.0003 inch or less, said W is approximately 0.0013 inch, and the height of said first and second magnetoresistive sensors is approximately 0.6 inch.

5. A method of sensing MICR characters on a carrier which is independent of the speed at which the carrier is moved relative to a reader, comprising the steps of:
    (a) positioning first and second magnetoresistive sensors on a substrate, with said first and second magnetoresistive sensors having a width W and a gap G therebetween, and with said W and G bearing a relationship to a font of MICR characters to be read, said first and second magnetoresistive sensors and said substrate comprising said reader;
    (b) providing relative movement between said reader and said carrier; and
    (c) coupling said first and second magnetoresistive sensors to a full bridge circuit whose output provides a magnetic waveform of the MICR character read;
said coupling step being effected through;
    (c-1) coupling said first magnetoresistive sensor and a first resistor in series with a first node therebetween;
    (c-2) coupling said second magnetoresistive sensor and a second resistor in series with a second node therebetween;
    (c3) coupling one end of said first resistor and one end of said second magnetoresistive sensor to a source of potential;
    (c-4) coupling one end of said second resistor and one end of said first magnetoresistive sensor to a ground; and
    (c-5) coupling said first and second nodes to a differential amplifier to provide said output.

6. The method as claimed in claim 5 in which said coupling step (c-5) is effected through using capacitors.

* * * * *